Sept. 29, 1931.  H. D. GEYER  1,825,393

STEERING WHEEL

Filed May 21, 1929

Inventor
Harvey D. Geyer

By Spencer Hardman & Fehr
His Attorneys

Patented Sept. 29, 1931

1,825,393

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

STEERING WHEEL

Application filed May 21, 1929. Serial No. 364,776.

This invention relates to handwheels, especially those which are adapted for use as steering wheels on automotive vehicles.

An object of this invention is to provide a strong efficient handwheel having improved appearance and wearing qualities of surface finish and which can be cheaply manufactured.

Another object is to provide an improved metal skeleton comprising a rim, spokes and hub ring which can be economically made and which is especially adapted to be encased in a molded covering of sheet celluloid or the like, after which the wheel hub can be efficiently assembled thereupon by rigidly fixing the same to the hub ring.

Another object is to provide a simple and efficient method of encasing the metal skeleton with a unitary molded covering of sheet celluloid.

Further objects and advantages of the present invention will be apparent from the following description, reference being had to the accompanying drawings, wherein a preferred embodiment of one form of the present invention is clearly shown.

In the drawings.

Similar reference characters refer to similar parts throughout the several views.

Figure 1:
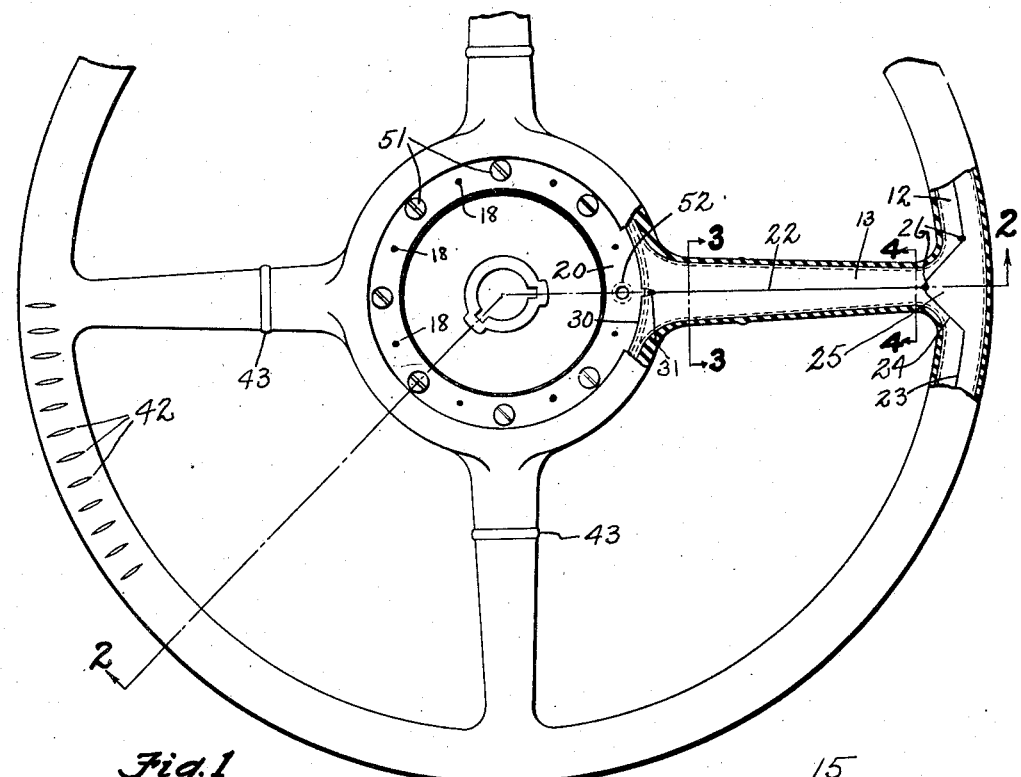
Fig. 1 is a plan view of an automobile steering wheel made according to this invention, a portion being shown with the molded casing removed to better show the construction of the metal skeleton.
Figure 2:
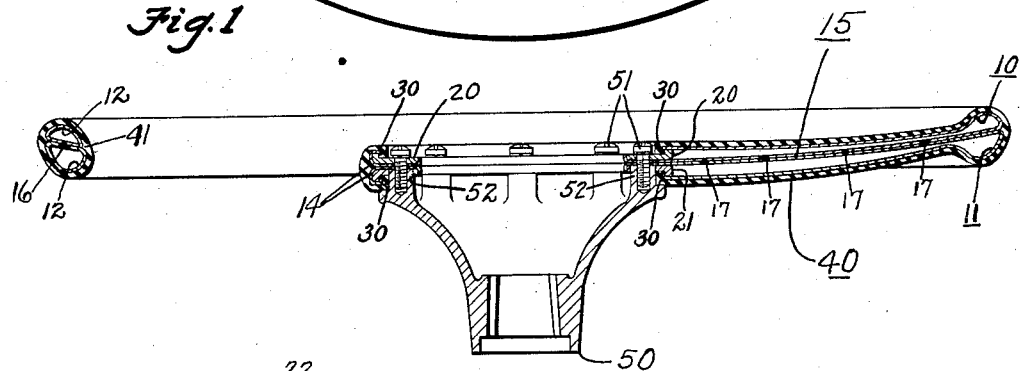
Fig. 2 is a section taken along line 2—2 of Fig. 1.
Figure 3:
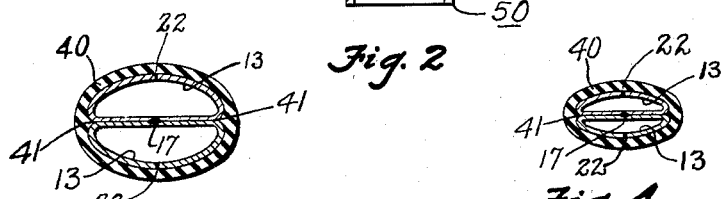
Fig. 3 is a section through one of the spokes and taken along line 3—3 of Fig. 1.
Figure 4:
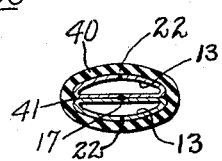
Fig. 4 is a section taken along line 4—4 of Fig. 1.

Numerals 10 and 11 designate the two unitary pressed metal half skeletons each formed with a rim portion 12, four spoke portions 13 and a hub ring portion 14. These two half skeletons 10 and 11 are rigidly fixed together back to back, preferably by suitably spaced spot welding, to form the metal skeleton designated as a whole by numeral 15. The two half skeletons 10 and 11 are each stamped out from a single piece of sheet metal, but before the rim and spoke portions 12 and 13 are formed to the closed sections as clearly shown in the drawings, they are placed back to back and spot welded together at suitably spaced points 16 and 17. Two reinforcing metal rings 20 and 21 are placed back to back with the hub ring portion 14 of the half skeletons 10 and 11 interposed therebetween and these four thicknesses of metal are spot welded together at suitably spaced points 18 around the hub ring. After such spot welding is done, the rim portions 12 and the spoke portions 13 are closed in by suitable dies to form the completely closed hollow flattened oval sections shown clearly in the drawings. The flanges of these portions are forced into closely abutting relationship along lines 22 and 23 so that when the molded covering is later molded on, the molded material will not enter the hollow spaces within these oval sections 12 and 13. Also the metal of the rim portions 12 is originally blanked out with tongues 25 thereon, which tongues 25 are bent inwardly and tack-welded at points 26 (as clearly shown in Fig. 1) and completely close the hollow sections along the line 24 at the points where the spoke portions 13 adjoin the rim portions 12. This method of completely closing the hollow tubular rim and spoke sections at these points is an improved feature of this invention, since if an opening leading into the hollow sections were permitted here, the outer covering of molded material would enter at such openings during the molding operation. Also, in order to securely close the hollow spoke sections where they adjoin the hub rings 20 and 21 as well as to strengthen the entire metal structure, the half skeletons 10 and 11 have downturned flanges 30 which are locked around the short circular flanges on the metal rings 20 and 21. Preferably the metal edges of the spoke portions 13 are tack-welded together and to the rings 20 and 21 at the points 31 (See Fig. 1).

The complete metal skeleton 15, formed as above described, is covered with a relatively thin molded casing 40 of sheet celluloid, or similar material by whatever name called. Preferably two blanks are first stamped out from sheet celluloid, each blank having rim, spokes and hub ring portions corresponding to the metal skeleton 15, said blanks however being of sufficient width in the various portions to permit their being bent up after being rendered pliable and roughly encase the metal rim, the four metal spokes, and the outer periphery of the hub ring, as clearly illustrated. The roughly covered metal skeleton is then inserted within a suitable divided molding die and the celluloid covering is molded under heat and pressure to form a complete one-piece casing for said skeleton and adhering closely and bonded to the metal surfaces thereof. Under such molding the celluloid material will become plastic and flow to completely fill all crevices, such as the small grooves 41 at the lateral edges of the metal spokes and rim and will otherwise conform itself accurately to the shape of the die cavity. For instance, the irregularities 42 on the wheel rim and the encircling beads 43 on the spokes (see Fig. 1) may be molded without corresponding irregularities in the metal skeleton simply by providing a die cavity with corresponding depressions within its walls. After the unitary celluloid casing 40 is molded in place upon the skeleton 15 the wheel hub 50 is rigidly fixed to the unencased portion of the hub ring by suitable means, such as by the screws 51. Preferably hub 50 has upstanding lugs 52 which project into corresponding holes in the lower metal ring 21 and thus serve as driving lugs for transmitting the torque from the wheel to the hub 50 which is, of course, keyed to the steering shaft (not shown). It is obvious that it would be very difficult and complicated to mold the celluloid casing upon the skeleton 15 after hub 50 is attached to the hub ring of said skeleton since, in such case, the molding die must necessarily receive hub 50 yet prevent its being encased with the molded celluloid. By making hub 50 detachable the molding operation is greatly facilitated and the entire cost of the wheel reduced.

While the form of embodiment of the present invention as herein disclosed, constitutes a preferred form, it is to be understood that other forms might be adopted, all coming within the scope of the claims which follow.

What is claimed is as follows:

1. A handwheel having an outer covering and a metal skeleton for the rim, spokes and hub ring, said skeleton comprising: two sheet metal stampings forming the upper and lower halves of said skeleton and rigidly fixed together, said two metal stampings each having a rim portion of substantially closed cross-section.

2. A handwheel having an outer covering and a metal skeleton for the rim, spokes and hub ring, said skeleton comprising: two sheet metal stampings forming the upper and lower halves of said skeleton and rigidly fixed together, said metal stampings each having a rim portion of flattened oval cross-section.

3. A handwheel having an outer covering and a metal skeleton for the rim, spokes and hub ring, said skeleton comprising: two sheet metal stampings forming the upper and lower halves of said skeleton and rigidly fixed together, said metal stampings each having spoke portions of substantially closed cross-section.

4. A handwheel having an outer covering and a metal skeleton for the rim spokes and hub ring, said skeleton comprising: two sheet metal stampings forming the upper and lower halves of said skeleton and rigidly fixed together, said metal stampings each having spoke portions of substantially D-shaped cross-section.

5. A handwheel having an outer covering and a metal skeleton for the rim, spokes and hub ring, said skeleton comprising: two sheet metal stampings forming the upper and lower halves of said skeleton and rigidly fixed together, said metal stampings each having spoke portions of flattened oval cross-section.

6. A handwheel having an outer covering and a metal skeleton for the rim, spokes and hub ring, said skeleton comprising: two sheet metal stampings forming the upper and lower halves of said skeleton and rigidly fixed together, said metal stampings each having both a rim portion and spoke portions of substantially closed cross-section.

7. A handwheel having an outer covering and a metal skeleton for the rim, spokes and hub ring, said skeleton comprising: a central metal ring having upwardly and downwardly turned peripheral flanges, upper and lower stamped metal spiders rigidly fixed together along their spoke portions and each having a central portion interlocking with said peripheral flanges respectively.

8. A handwheel having an outer covering and a metal skeleton for the rim, spokes and hub ring, said skeleton comprising: a central metal ring having a peripheral flange thereon, a stamped metal spider having spoke portions and a central annulus portion interlocking with said peripheral flange.

9. A handwheel having an outer covering and a metal skeleton for the rim, spokes and hub ring, said skeleton comprising: two central metal rings, upper and lower stamped metal spiders rigidly fixed together along their spoke portions and each spider having a central annulus portion lying between and rigidly fixed to said central metal rings.

In testimony whereof I hereto affix my signature.

HARVEY D. GEYER.